United States Patent
Sudo et al.

(10) Patent No.: US 8,769,988 B2
(45) Date of Patent: *Jul. 8, 2014

(54) METHOD AND APPARATUS FOR MANUFACTURING VITREOUS SILICA CRUCIBLE

(75) Inventors: Toshiaki Sudo, Akita (JP); Hiroshi Kishi, Akita (JP); Kouta Hasebe, Akita (JP)

(73) Assignee: Japan Super Quartz Corporation, Akita-shi (JP)

( * ) Notice: Subject to any disclaimer, the term of this patent is extended or adjusted under 35 U.S.C. 154(b) by 165 days.

This patent is subject to a terminal disclaimer.

(21) Appl. No.: 13/308,277

(22) Filed: Nov. 30, 2011

(65) Prior Publication Data

US 2012/0137733 A1     Jun. 7, 2012

(30) Foreign Application Priority Data

Dec. 2, 2010 (JP) ................................. 2010-268895

(51) Int. Cl.
*C03B 19/09* (2006.01)
*C03B 29/02* (2006.01)

(52) U.S. Cl.
CPC ............... *C03B 19/095* (2013.01); *C03B 29/02* (2013.01)
USPC ................................ 65/17.6; 65/17.4; 65/144

(58) Field of Classification Search
CPC .............................. C03B 19/09; C03B 19/095
See application file for complete search history.

(56) References Cited

U.S. PATENT DOCUMENTS

| | | | | |
|---|---|---|---|---|
| 4,010,064 A | * | 3/1977 | Patrick et al. | ................. 117/208 |
| 4,935,046 A | * | 6/1990 | Uchikawa et al. | ............. 65/17.4 |
| 6,548,131 B1 | * | 4/2003 | Englisch et al. | ............. 428/34.4 |
| 8,276,402 B2 | * | 10/2012 | Sudo et al. | ..................... 65/17.4 |
| 2002/0134108 A1 | * | 9/2002 | Werdecker et al. | ............ 65/17.6 |
| 2004/0050099 A1 | | 3/2004 | Fukui | |
| 2004/0172976 A1 | * | 9/2004 | Shimizu | ......................... 65/272 |
| 2009/0320521 A1 | * | 12/2009 | Lehmann et al. | .............. 65/17.6 |

(Continued)

FOREIGN PATENT DOCUMENTS

| EP | 1391542 A1 | 2/2004 |
|---|---|---|
| EP | 2168925 A2 | 3/2010 |

(Continued)

OTHER PUBLICATIONS

Extended European Search Report mailed Mar. 28, 2012, issued in corresponding European Application No. EP11191145.9, 8 pages.

*Primary Examiner* — Matthew Daniels
*Assistant Examiner* — Lisa Herring
(74) *Attorney, Agent, or Firm* — Christensen O'Connor Johnson Kindness PLLC

(57) ABSTRACT

Provided is a method for manufacturing a vitreous silica crucible and a manufacturing apparatus for the same, which can reduce the amount of bubbles and impurities of a crucible inner surface and enhance a crystallization yield of silicon single crystal. A method for manufacturing a vitreous silica crucible of the invention includes a silica powder supplying process of supplying silica powder in a rotating mold to form a silica powder layer; an arc fusing process of fusing the silica powder layer by arc discharge generated by carbon electrodes; and a fire polishing process of throwing an arc flame toward a target surface of the silica powder layer for surface removal, wherein, in the fire polishing process, the distances from the tips of the carbon electrodes to the target surface is set to be equal.

5 Claims, 12 Drawing Sheets

(56) References Cited

U.S. PATENT DOCUMENTS

| | | | |
|---|---|---|---|
| 2010/0071417 A1* | 3/2010 | Kishi et al. | 65/66 |
| 2010/0071613 A1 | 3/2010 | Kishi | |
| 2010/0244311 A1 | 9/2010 | Kishi | |
| 2011/0023773 A1* | 2/2011 | Harada et al. | 117/208 |

FOREIGN PATENT DOCUMENTS

| | | |
|---|---|---|
| EP | 2226300 A1 | 9/2010 |
| JP | 06-191986 A | 7/1994 |
| JP | 10-025184 A | 1/1998 |
| WO | WO 2009122936 A1 * | 10/2009 |

* cited by examiner

METHOD AND APPARATUS FOR MANUFACTURING VITREOUS SILICA CRUCIBLE

CROSS-REFERENCE TO RELATED APPLICATION

This application is related to Japanese Patent Application No. 2010-268895 filed on Dec. 2, 2010, whose priority is claimed and the disclosure of which is incorporated by reference in its entirety.

BACKGROUND OF THE INVENTION

1. Field of the Invention

The present invention relates to a method and an apparatus for manufacturing a vitreous silica crucible, and more specifically relates to a method and an apparatus for manufacturing a vitreous silica crucible having an excellent inner surface property.

2. Description of the Related Art

A silicon single crystal has been manufactured by the Czochralski method (the CZ method) using a vitreous silica crucible. In this method, a seed crystal is dipped into a silicon melt in a vitreous silica crucible at high temperature, and the seed crystal is gradually pulled to produce a silicon single crystal. A highly-pure vitreous silica crucible is used to contain the silicon melt.

A vitreous silica crucible for pulling single crystal silicon is primarily manufactured by the arc fusing method. In this method, silica powder is deposited on an inner surface of a carbon-made rotating mold to form a silica powder layer with a predetermined thickness, and the silica powder layer is heated and fused to be vitrified by arc discharge generated by electrodes mounted on an upper position of the inner side of the mold. This method is called "the rotating mold method."

This vitreous silica crucible has a two-layer structure including a vitreous silica layer containing a number of bubbles on the outer side, and a transparent layer vitreous silica layer on the inner side (hereinafter, referred to as "transparent layer"). Such vitreous silica crucible is manufactured by a method including the process of fusing silica powder layer under a reduced pressure, which is caused by suction from the mold side (JP-A-H6-191986 and JP-A-H10-025184). In the fusing process, in order to achieve deaeration of the silica powder layer by the reduced pressure (this is called "vacuum suction"), a thin vitreous silica layer is formed by uniformly fusing an inner surface of the silica powder layer. This thin vitreous silica layer (hereinafter referred to as "seal layer") seals the inner surface to enhance the vacuum level of the inside of the silica powder layer.

Nowadays, wafers with a diameter of over 300 mm have been manufactured in order to enhance efficiency of a device manufacturing process, and this requires longer pulling time. Therefore, there is required a vitreous silica crucible, which can pull a single crystal with a large diameter at a temperature of over 1400 degrees C. and for a period of approximately 100 hours. In addition, improvement of crucible properties such as an inner surface state etc. of a vitreous silica crucible has been strongly demanded because such crucible properties directly influence controllability of oxygen concentration Oi and single crystallization yield, etc., which are demanded for device miniaturization.

SUMMARY OF THE INVENTION

In the above-mentioned rotating mold method, a seal layer is formed to enhance the vacuum level of the inside of the silica powder layer. However, because this seal layer is formed before the crucible inner surface is sealed, the seal layer contains a large amount of bubbles, which is too much for single crystal pulling. Furthermore, this seal layer includes impurities, which are either already contained before the fusing or attached after the start of the fusing.

When bubbles and impurities exist on an inner surface of a vitreous silica crucible, the impurities promote formation of cristobalite on the inner surface on the process of pulling a crystal, which results in formation of spotty cristobalite. Thus-formed cristobalite is peeled off from the crucible and dropped into the silicon melt, which can lead to bad influences such as decrease of single crystallization yield at the growth of a single crystal. In addition, formation and peel-off of cristobalite occurs in an uncontrollable way.

The present invention has been accomplished in view of the above-mentioned circumstances, and provides a method and apparatus for manufacturing a vitreous silica crucible with a crucible inner surface with reduced amount of bubbles and impurities.

A method for manufacturing a vitreous silica crucible of the invention includes a silica powder supplying process of supplying silica powder in a rotating mold to form a silica powder layer; an arc fusing process of fusing the silica powder layer by arc discharge generated by carbon electrodes; and a fire polishing process of throwing an arc flame toward a target surface of the silica powder layer for surface removal, wherein, in the fire polishing process, distances from tips of the carbon electrodes to the target surface are set to be equal. According to this method, residual bubbles and impurities in a seal layer of a crucible inner surface can be removed and therefore crucible properties can be improved.

Here, the crucible properties that can be improved by the present invention mean factors, which can influence properties of semiconductor single crystal pulled by the vitreous silica crucible. Such properties includes a vitrification state on an crucible inner surface, a bubble distribution and bubble size along a thickness direction, impurities distribution, surface irregularity, and ununiformity of these factors along the crucible height direction.

In the fire polishing process, an angle of a central axis line of the carbon electrodes and a mold rotation axis line is set to be 0.5 to 60°. This configuration enables an arc flame generated between carbon electrodes to be efficiently thrown toward a crucible inner surface Furthermore, in the fire polishing process, the distances from the tips of the carbon electrodes to the target surface may be set to be 5 to 200 mm. According to this configuration, a layer with a thickness of 0.1 to 0.5 to 2 mm can be removed together with bubbles and impurities therein, and thus crucible properties can be improved.

Furthermore, the carbon electrodes may be positioned so that distances between the tips of the adjacent carbon electrodes are equal. According to this configuration, a stable arc flame can be generated, and therefore properties in the crucible inner surface can be uniformized.

Furthermore, the fire polishing process may be carried out during 10 to 90% of the total arc time. According to this configuration, the thickness of the target surface removed in the fire polishing time can be adjusted by changing the fire polishing time, and therefore, the amount of bubbles and impurities, which remain after the fire polishing process can be set to a predetermined range.

Furthermore, the fire polishing process may be carried out after or at the same time with the arc fusing process. When the fire polishing process is carried out together with the arc fusing process, operation time and power consumption can be reduced, which leads to reduction in manufacturing cost.

Furthermore, the fused layer thickness can be increased while maintaining the sealing state, and therefore bubble content and bubble size can be controlled to a desired condition, and impurities etc. can be removed. When the fire polishing process is carried out separately with the arc fusing process, the amount of the surface removal in the fire polishing process and the fused state (including bubble distribution) in the arc fusing process can be more precisely set.

The meaning of "the fire polishing process is carried out after or at the same time with the arc fusing process" means the fire polishing process where the fused thickness is reduced and the arc fusing process where the fused thickness is increased are carried out separately or simultaneously. When the fused thickness has been increased, the fire polishing process can be carried out together with the arc fusing process.

Furthermore, in the fire polishing process, the arc flame may be moved from a bottom center to an upper end of the crucible. According to this configuration, heating position is moved from a bottom center to an upper end of the crucible. This movement is consistent with a conventional preferred method for manufacturing a vitreous silica crucible, and enables fire-polishing in response to in-plane distribution of increasing fused thickness. Therefore, according to this configuration, bubbles and impurities in the entire crucible inner surface can be efficiently removed and a vitreous silica crucible with uniform property can be manufactured.

Furthermore, the arc flame may be moved from an upper end to a bottom center of the crucible. This configuration prevents removed impurities etc. to be reattached to the crucible inner surface, and therefore, bubbles and impurities in the entire crucible inner surface can be efficiently removed and a vitreous silica crucible with uniform property can be manufactured.

Furthermore, in the fire polishing process, the arc flame may be set to be moved at a speed of 0.1 to 50 cm/min with respect to the target surface. According to this configuration, a layer with a thickness of 0.1 to 2 mm can be removed together with bubbles and impurities therein, and thus crucible properties can be improved. Here, the above "speed" means a relative speed with respect to the target surface when the relative movement due to mold rotation is disregarded. In other words, the above "speed" means a relative speed in a cross sectional view including a central axis line of the mold. Furthermore, the above "speed" means a moving speed of an arc flame central position in the above cross sectional view, and thus change in relative position between the electrodes and the rotating mold caused by tilting of the electrodes may not be taken into account unless the arc flame central position is changed. Then, a crucible can be manufactured under the moving speed control and the electrode angle control.

Furthermore, a fused state and a surface removal state in respective band portions (zones), which are symmetric around the mold rotation axis line can be controlled by setting the moving speed of the arc flame. For example, fire polishing time for a corner portion may be increased or decreased compared with that for a bottom portion or a sidewall portion. Furthermore, time for the fire polishing process may be increased or decreased for each zone. According to this configuration, an average OH group concentration in a pulling process can be set to a certain range and thus cristobalite generation in each zone can be controlled.

For example, as a specific control of a moving speed in a manufacturing process, with respect to a moving speed of arc flame central position on a sidewall portion, a moving speed on a corner section may be 0.89 to 0.93 and a moving speed on a bottom portion may be 0.93 to 0.95.

An apparatus for manufacturing a vitreous silica crucible of the invention by the above-mentioned method includes:

a rotating mold for defining an outer shape of the vitreous silica crucible and in which silica powder is supplied to form a silica powder layer;

an arc discharge unit comprising carbon electrodes and a power-supply unit with which the silica powder layer is heated and fused by arc discharge generated by the carbon electrodes; and an electrode position setting unit for controlling positions of tips of the carbon electrodes with respect to the mold while maintaining, to be equal, distances between tips of the adjacent carbon electrodes. According to this configuration, bubbles and impurities in the crucible inner surface can be removed, and thus crucible properties can be improved.

The manufacturing apparatus may further include a mold position setting unit for controlling a horizontal position and an angle of a mold rotation center line, which is a mold rotation axis line, and controlling a mold height. According to this configuration, a relative position between a carbon electrodes and a mold can be set to a desired position. In addition, a silica powder layer can be uniformly fused in the arc fusing process and bubbles and impurities in the crucible inner surface can be uniformly removed and a vitreous silica crucible with uniform property can be manufactured.

Furthermore, according to the present invention, one or both of the electrode position setting unit and the mold position setting unit may be configured to be capable of setting, to be equal, distances from tips of the carbon electrodes to a target surface of the silica powder layer. According to this configuration, in the fire polishing process, an arc flame thrown toward a target surface can be stabilized, and bubbles and impurities in the crucible inner surface can be uniformly removed, uniformity of the crucible inner surface can be enhanced, and thus a vitreous silica crucible with uniform properties can be manufactured.

Furthermore, the distances from the tips of the carbon electrodes to the target surface may be set to be 5 to 200 mm. According to this configuration, a layer with a thickness of 0.1 to 2 mm can be removed together with bubbles and impurities therein, and thus crucible properties can be improved.

As mentioned above, according to the present invention, bubbles and impurities contained in a crucible inner surface can be removed by throwing an arc flame thereto, and thus there is manufactured a vitreous silica crucible with reduced amount of bubbles and impurities and is capable of achieving a high crystallization yield in silicon single crystal pulling.

DESCRIPTION OF THE PREFERRED EMBODIMENTS

Hereinafter, there will be explained, in detail, an embodiment of a method and an apparatus for manufacturing a vitreous silica crucible according to the present invention, with reference to drawings.

Figure 1:
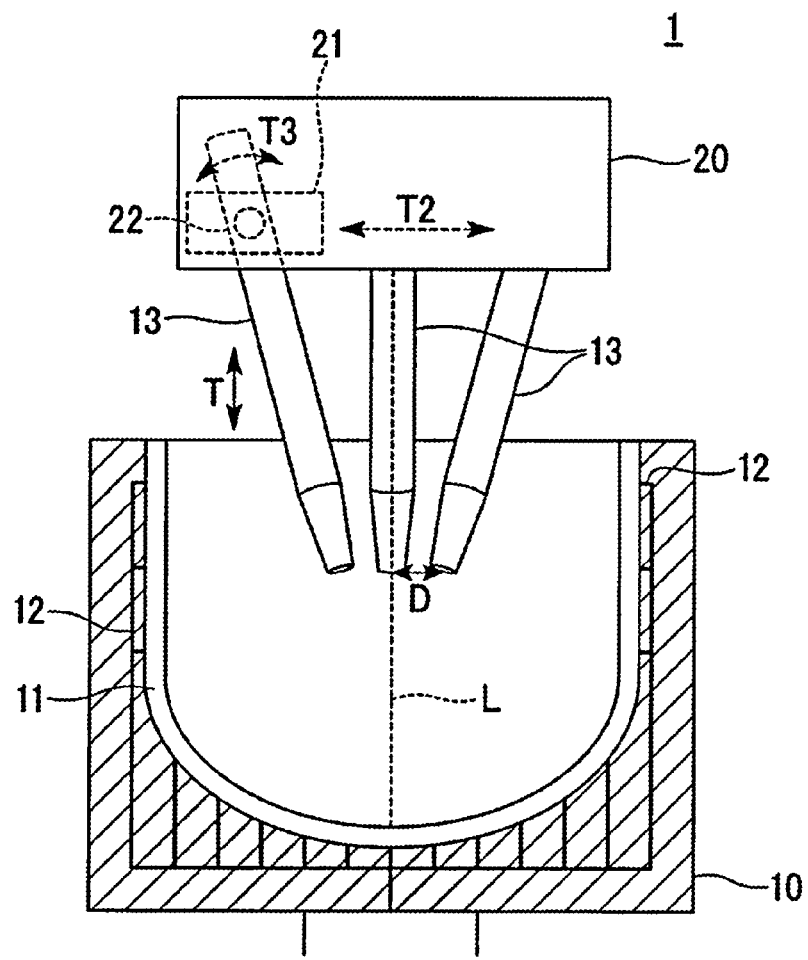
FIG. 1 is a front sectional view illustrating an apparatus for manufacturing a vitreous silica crucible according to the present invention.

FIG. 1 is a front sectional view illustrating an apparatus for manufacturing a vitreous silica crucible according to the present invention. In FIG. 1, reference symbol 1 refers to an apparatus for manufacturing a vitreous silica crucible.

A method for manufacturing a vitreous silica crucible according to the present invention relates to the rotating mold method using an apparatus 1 for manufacturing a vitreous silica crucible shown in FIG. 1. As shown in FIG. 1, the apparatus 1 includes a mold 10, which is rotatable by a rotation unit (not shown) and defines an outer shape of a vitreous silica crucible. Silica powder is supplied and deposited on the inner surface of the mold 10 to form a silica powder layer 11 with a predetermined thickness. The mold 10 includes ventilation holes 12, which are open to the inside of the mold 10. The ventilation holes 12 are connected to a pressure-reducing unit (not shown). Carbon electrodes 13 for arc heating are provided above the mold, and are connected to a power-supply unit (not shown). Carbon electrodes 13 can be used to heat the silica powder layer 11. As shown in arrows T and D, a vertical position and an intertip distance (a distance between tips of the electrodes 13) of the carbon electrodes 13 can be adjusted by an electrode position setting unit 20.

The apparatus 1 is a high-output apparatus, which can heat and fuse a nonconductive material (silica powder) by arc discharge between carbon electrodes 13 with an output range of 300 kVA to 12,000 kVA.

As silica powder, synthetic silica powder is primarily used for the inner face layer and natural silica powder is primarily used for the outer layer.

Here, synthetic silica powder means powder made of synthetic silica, and is a chemically synthesized and manufactured material. Synthetic silica powder is amorphous. Because the raw material of synthetic silica is gas or liquid, it can be easily purified, and thus synthetic silica powder can be more highly-pure than natural silica powder. Raw material of synthetic silica may be gaseous raw material such as silicon tetrachloride, or may be liquid raw material such as silicon alkoxide. In synthetic vitreous silica, the amount of any metal impurity can be made 0.1 ppm or less.

Synthetic silica powder made by the sol-gel method usually includes 50 to 100 ppm of residual silanol generated by hydrolysis of alkoxide. The amount of silanol of synthetic silica powder made by silicon tetrachloride as raw material can be controlled in a broad range of 0 to 1000 ppm, and usually includes chlorine in a concentration of approximately 100 ppm or more. When alkoxide is used as the raw material, synthetic vitreous silica not including chlorine can be easily obtained. Synthetic silica powder made by the sol-gel method includes silanol in a concentration of 50 to 100 ppm before fusing as mentioned above. When the powder is vacuum-fused, silanol is removed and the amount of silanol in the obtained vitreous silica is reduced to approximately 5 to 30 ppm. It should be noted that the amount of silanol changes depending on fusing conditions such as fusing temperature, elevated temperature etc. Natural vitreous silica obtained by fusing natural silica powder in the same conditions includes silanol in a concentration of less than 50 ppm.

In general, synthetic vitreous silica (vitreous silica obtained by fusing synthetic silica powder) is said to have lower high-temperature viscosity than natural vitreous silica (vitreous silica obtained by fusing natural silica powder). One of the reasons for the lower high-temperature viscosity is that silanol or halogen destroys a mesh structure of $SiO_4$ tetrahedron. Synthetic vitreous silica has high light transmissibility for ultraviolet with a wavelength of approximately 200 nm or less. This synthetic vitreous silica has similar properties to synthetic vitreous silica made of silicon tetrachloride as raw material and for ultraviolet optics. Unlike natural vitreous silica, when synthetic vitreous silica is excited by ultraviolet light with a wavelength of 245 nm, fluorescence peaks are not observed in the obtained fluorescence spectrum.

Furthermore, natural silica powder means powder made of natural silica. Natural silica means a material obtained by the processes of digging out naturally-existing quartz raw stones followed by crushing and purification etc. Natural silica powder is made of α-quartz crystal. Natural silica powder contains Al and Ti in a concentration of 1 ppm or more. Natural silica powder contains other metal impurities in a higher concentration than synthetic silica powder. Natural silica powder barely contains silanol.

When light transmissibility of natural vitreous silica is measured, light transmissibility rapidly decrease as the wavelength becomes shorter than 250 nm and light transmissibility is very small for light with a wavelength of 200 nm. This is mainly because of Ti contained in a concentration of about 1 ppm as impurities. An absorption peak is observed at around 245 nm. This peak is assigned to oxygen deficiency defects.

When natural vitreous silica is excited by ultraviolet light with a wavelength of 245 nm, fluorescence peaks at wavelengths of 280 nm and 390 nm are observed. These peaks are assigned to oxygen deficiency defects in the vitreous silica.

Whether vitreous silica is natural or synthetic may be determined by measuring either impurities concentrations, the amount of silanol, light transmissibility, or a fluorescence spectrum obtained by exciting the vitreous silica with ultraviolet light with a wavelength of 245 nm.

In the present invention, silica powder is used as raw material. Silica powder may be either synthetic silica powder or natural silica powder. Natural silica powder may be quartz powder, or powder of a well-known raw material for a vitreous silica crucible such as quartz crystal, quartz sand etc. Furthermore, silica powder may be crystalline, amorphous, or vitreous.

Figure 2:
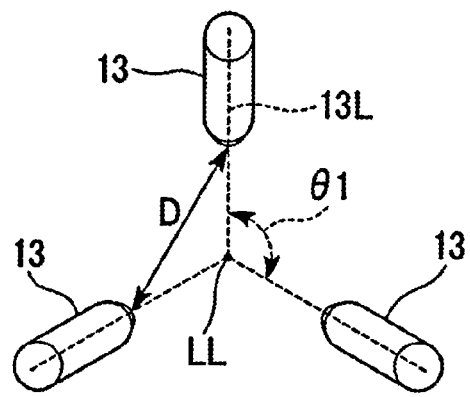
FIG. 2 is a plan view illustrating an electrode placement state of an apparatus for manufacturing a vitreous silica crucible according to the present invention.
Figure 3:
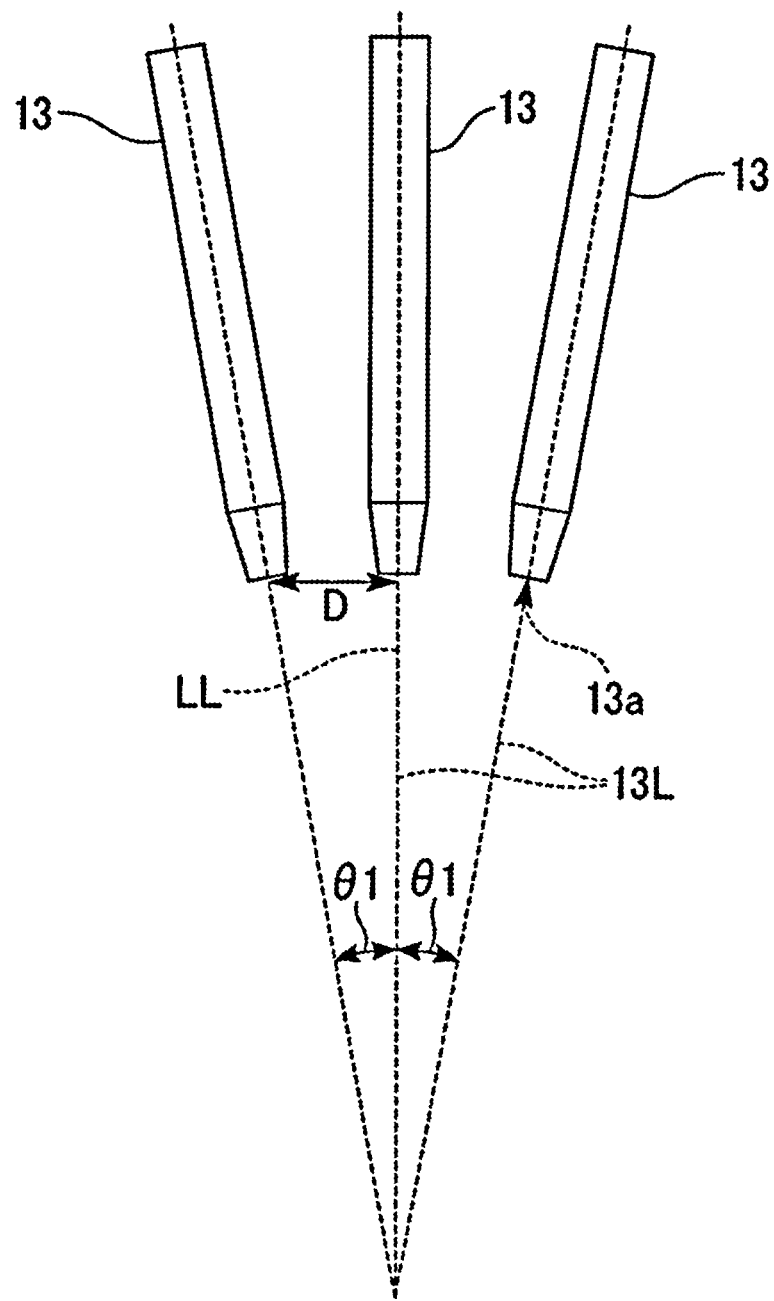
FIG. 3 is a front view illustrating an electrode placement state of an apparatus for manufacturing a vitreous silica crucible according to the present invention.

FIG. 2 and FIG. 3 are a plan view and a side view, respectively, each illustrating a carbon electrodes position of an arc discharge apparatus according to the present invention.

Carbon electrodes 13 are of the same shape so that they are used to generate arc discharge in alternate current three phase (R phase, S phase, T phase). As shown in FIGS. 2 and 3, they are provided to form an inverse three-sided pyramid having a downwardly-directed tip. In addition, they are provided so that angles between axes 13L of the electrodes 13 are θ1. Power supply to the electrodes 13 can be controlled by a controller (not shown). In FIGS. 2 and 3, the electrodes 13 are positioned so that an arc flame generated by the electrodes 13 is thrown toward the electrode central axis line LL. The number, a position, and a power supply method are not limited to the above-mentioned configuration, and other configurations may be employed.

Carbon electrodes 13 may be made of highly-pure carbon particles with a particle diameter of 0.3 mm or less, preferably 0.1 mm or less, more preferably 0.05 mm or less. When the density is 1.30 g/cm$^3$ to 1.80 g/cm$^3$ or 1.30 g/cm$^3$ to 1.70 g/cm$^3$, the difference in density between the carbon electrodes 13 may be made 0.2 g/cm$^3$ or less, and thus the carbon electrodes 13 can be made highly uniform.

As shown in FIG. 1, an electrode position setting unit 20 includes a supporting unit 21, a horizontal movement unit, a vertical movement unit, and a rotation angle setting unit. The supporting unit 21 supports the carbon electrode 13 so that an intertip distance (a distance between tips of the carbon electrodes 13) D is adjustable. The horizontal movement unit enables horizontal movement of the supporting unit 21. The vertical movement unit enables vertical movement of the supporting units 21 and the horizontal movement units together. The rotation angle setting unit enables adjustment of supporting angle of the carbon electrodes 13. In the supporting unit 21, the carbon electrodes 13 are rotatably supported at an angle setting axis 22, and provided is a rotation unit to control a rotation angle of the angle setting axis 22. An intertip distance D and an electrode position state can be adjusted by controlling the angles of the carbon electrodes 13 as shown in the arrow T3 by the rotation angle setting unit and controlling a horizontal position of the supporting unit 21 as shown in the arrow T2 by the horizontal movement unit.

Furthermore, a horizontal position of the electrode central axis line LL and the mold rotation axis line are controlled by the horizontal movement unit. Furthermore, a vertical position of the supporting unit 21 is controlled as shown in the arrow T of FIG. 1 by the vertical movement unit to control the height position of electrode tips 13a with respect to the bottom position of the silica powder layer 11. At the same time, angles of the carbon electrodes 13 are discretely set by the rotation angle setting unit as shown in FIG. 5 to control the direction of the arc flame (the electrode central axis line) LL so as to be directed to a direction of Ψ1 from the vertical direction.

Figure 4:
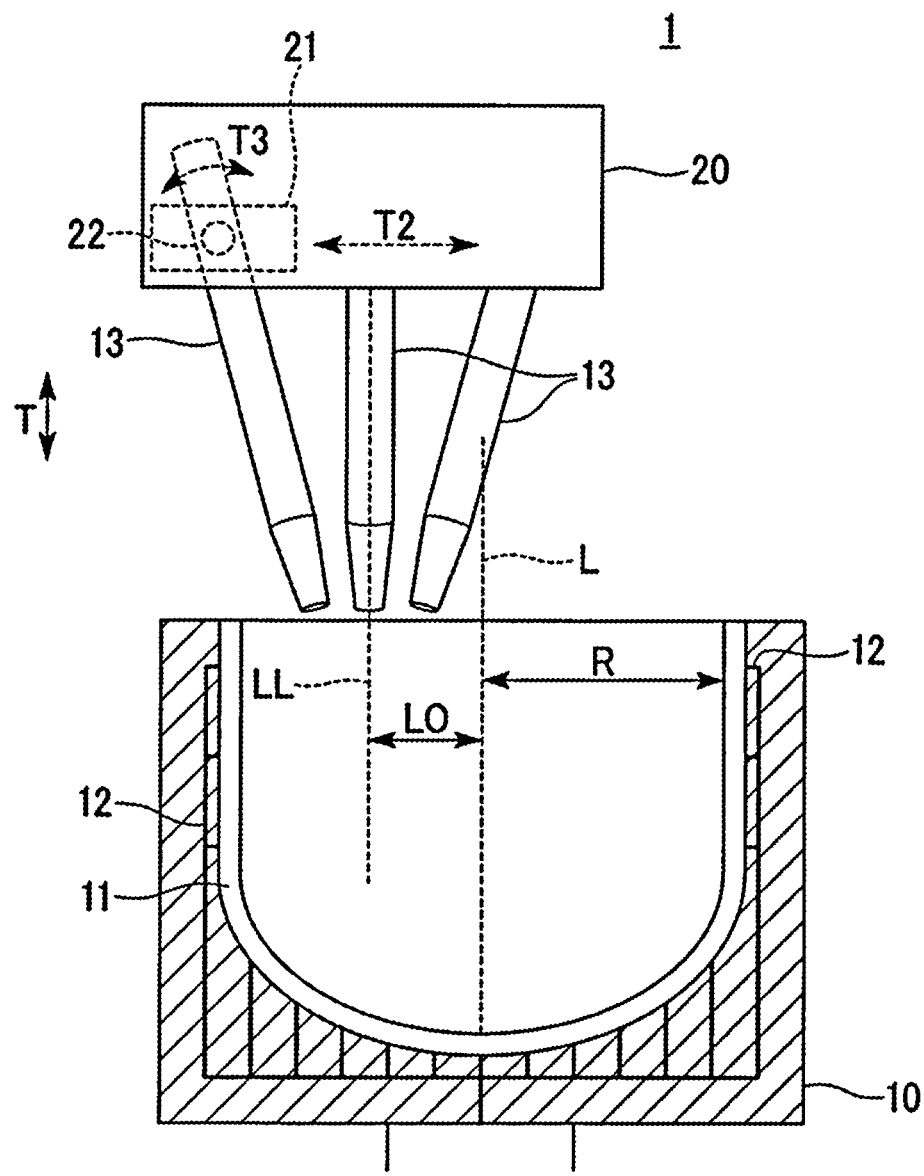
FIG. 4 is a front sectional view illustrating an eccentric carbon electrodes positioning state of an apparatus for manufacturing a vitreous silica crucible according to the present invention.
Figure 5:
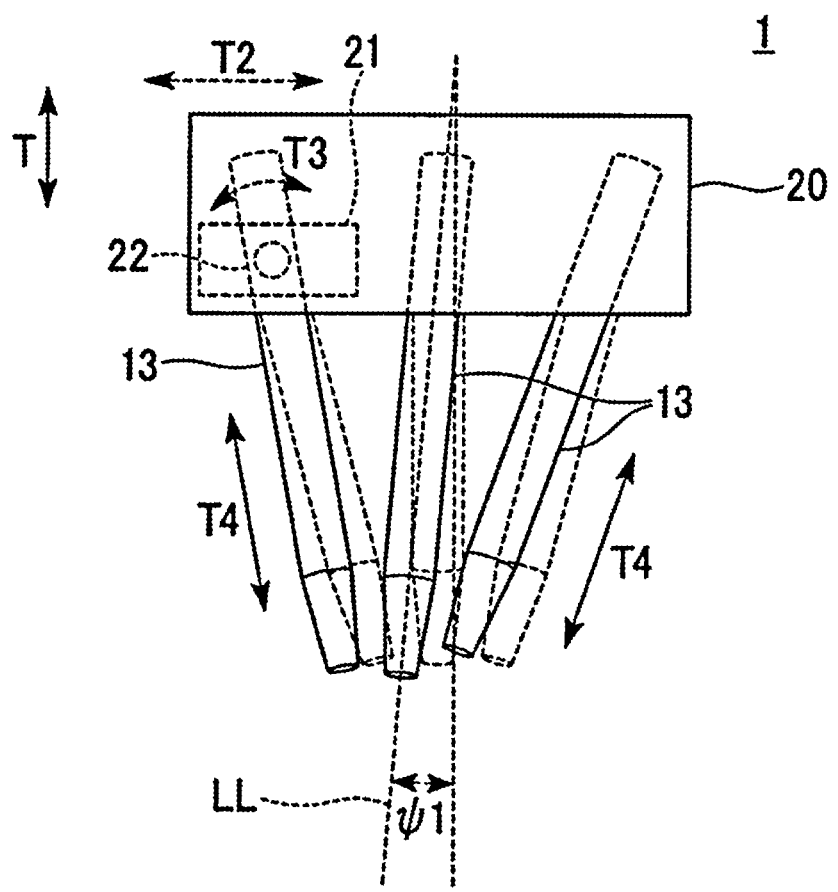
FIG. 5 is a front sectional view illustrating an arc state with displaced electrodes of an apparatus for manufacturing a vitreous silica crucible according to the present invention.

In FIGS. 1, 4, and 5, only the carbon electrode 13 at the left end is supported by the supporting unit 21 and so on. However, other carbon electrodes are also supported by the same structure. A height (the arrow T), a horizontal position (the arrow T2), an angle (the arrow T3) and a length dimension (the arrow T4) are separately controllable by the combination of these setting units.

Figure 7:
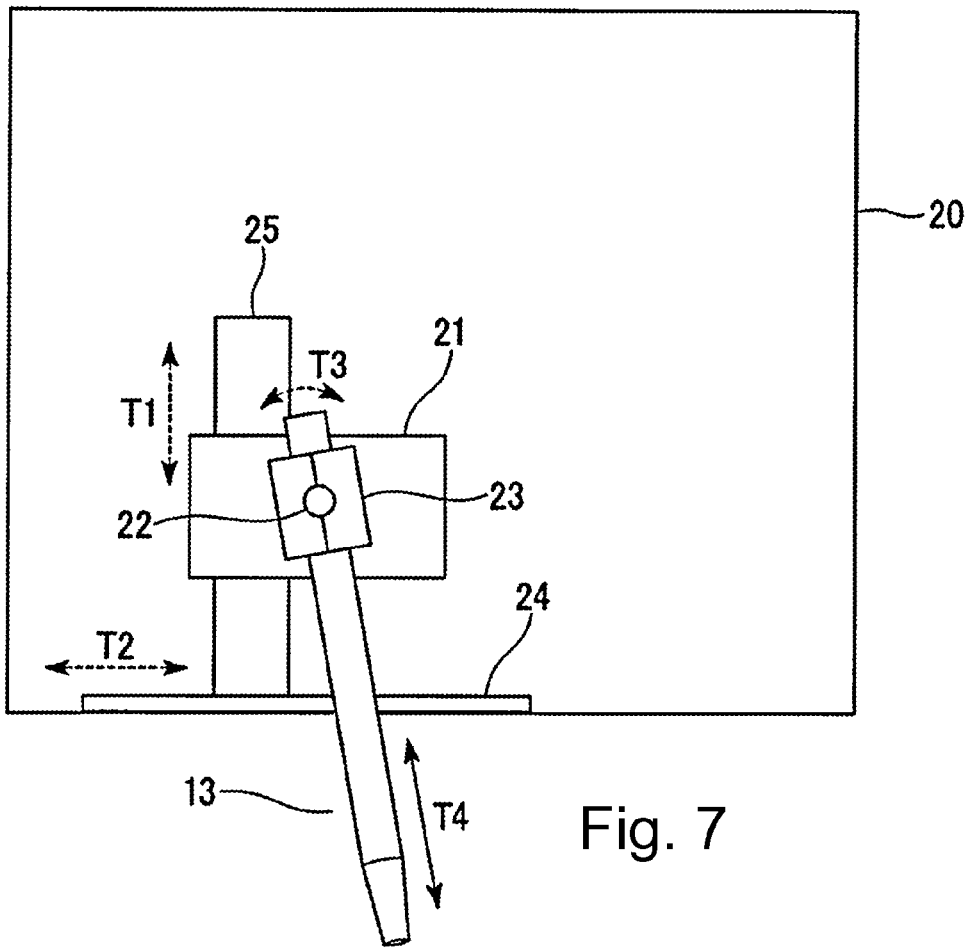
FIG. 7 is a front view illustrating an electrode position setting unit of an apparatus for manufacturing a vitreous silica crucible according to the present invention.

As shown in FIG. 7, an electrode position setting unit 20 includes a base 24, which is provided on a ceiling portion so as to be movable in a horizontal direction (XY direction). The ceiling portion is placed on an upper portion of the mold 10, and separates an inner space and an outer space of a vitreous silica manufacturing furnace. A vertical position regulator 25 is provided on the base 24. The vertical position regulator 25 regulates a vertical position of the supporting unit 21 by a mechanism such as rack and pinion. The supporting unit 21 is movable in a vertical direction T1. An electrode supporting unit 23 is provided on the supporting unit 21 movably around the rotation axis line 22. The electrode supporting unit 23 supports the carbon electrodes 13, and is capable of adjusting a length in a direction of T4. The carbon electrode 13 is detachable from the electrode supporting unit 23. Rotation angle between the supporting unit 21 and the electrode supporting unit 23, a horizontal position of the base 24, and a vertical position of the supporting unit 21 with respect to the vertical position regulator 25 can be separately adjustable by a position regulator and a driving unit to drive this position regulator.

Figure 6:
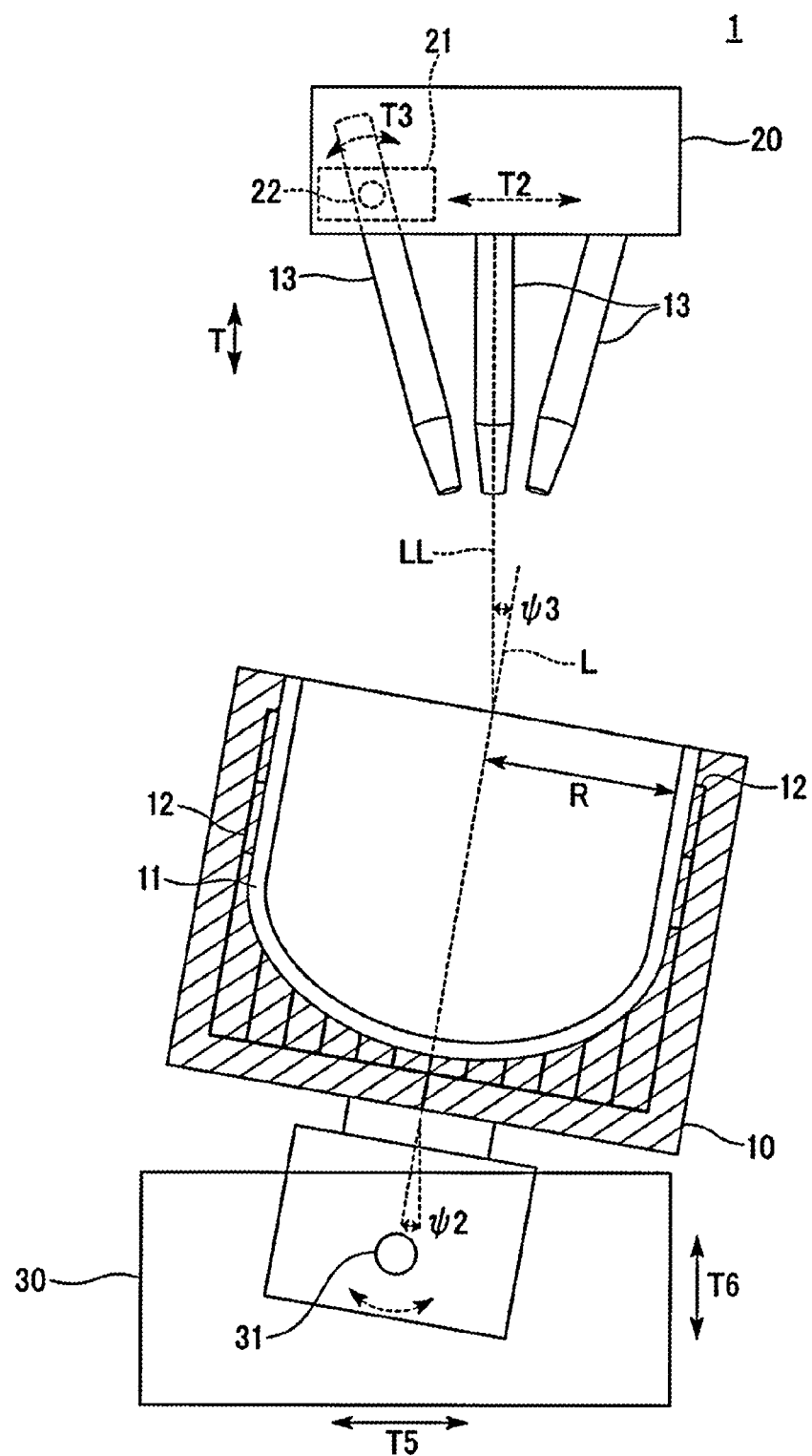
FIG. 6 is a front sectional view illustrating an arc state with displaced electrodes and a mold of an apparatus for manufacturing a vitreous silica crucible according to the present invention.

In the present invention, other configurations may be employed as long as positions of the carbon electrodes 13 are controllable. Specifically, as shown in FIG. 6, an angle of the rotating mold 10 can be adjusted by tilting the rotating mold center line L around a horizontal rotation axis 31 by a mold position setting unit 30, which can change the rotation axis line L of the mold 10 (the mold rotation axis line) from the vertical direction. Thus, the relative position between the carbon electrodes 13 and the mold 10 can be controlled. As shown in FIG. 6, the mold position setting unit 30 includes a rotation angle setting unit, a horizontal movement unit, and a vertical movement unit. The rotation angle setting unit can change the direction of the mold rotation axis line L so as to be directed to a direction of Ψ2 from the vertical direction. The horizontal movement unit can move the mold 10 in a horizontal direction (the arrow T5). The vertical movement unit can move the mold 10 in a vertical direction (the arrow T6). The relative position between the rotating mold 10 and each of the carbon electrodes 13 can be controlled in combination of these setting units.

Next, a method for manufacturing a vitreous silica crucible according to the present embodiment will be explained with reference to drawings.

Figure 10:
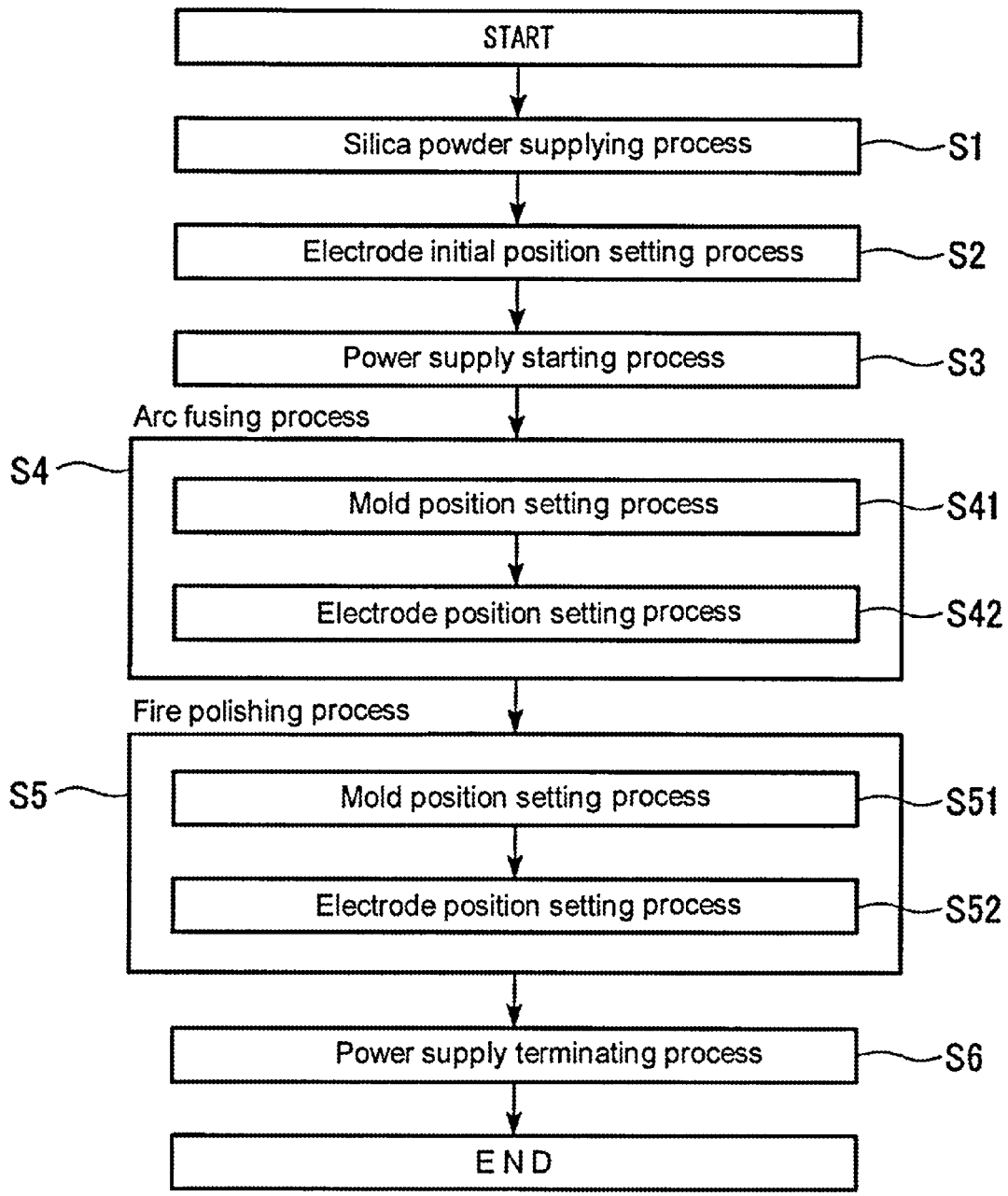
FIG. 10 is a flowchart illustrating an embodiment of a method for manufacturing a vitreous silica crucible according to the present invention.

FIG. 10 is a flowchart illustrating a method for manufacturing a vitreous silica crucible according to the present invention.

A method for manufacturing a vitreous silica crucible according to the present embodiment is a method by the rotating mold method using a vitreous silica crucible manufacturing apparatus 1. As shown in FIG. 10, the method includes a silica powder supplying process S1, an electrode initial position setting process S2, a power supply starting process S3, an arc fusing process S4, a fire polishing process S5, a power supply terminating process S6. Hereinafter, each process will be explained.

<Silica Powder Supplying Process S1>

In the silica powder supplying process S1 shown in FIG. 10, silica powder is deposited on an inner surface of the mold 10 to form a silica powder layer 11 in a desired condition. This silica powder layer 11 is retained onto the inner wall surface by a centrifugal force due to the rotation of the mold 10.

<Electrode Initial Position Setting Process S2>

In the electrode initial position setting process S2 shown in FIG. 10, as shown in FIGS. 1 to 3, initial positions of the carbon electrodes 13 are set by the electrode position setting unit 20 so that the carbon electrodes 13 forms an inverse three-sided pyramid. Each axis line 13L is directed to a direction of an angle θ1, and the tips of the carbon electrodes 13 contact one another. In addition, an initial state of a mold-electrode relative position comprised of an electrode height, which is a height dimension from the edge of the mold 10 to the electrode tips, or a position and an angle of an electrode position central axis (which is a central axis of an inverse three-sided pyramid formed by the carbon electrodes 13) and a rotation axis line of the mold 10 is also set.

<Power Supply Starting Process S3>

In the power supply starting process S3 shown in FIG. 10, powder is supplied to the carbon electrodes 13 in an amount of 300 kVA to 12,000 kVA by the power-supply unit (not shown). Arc discharge is not yet generated at this stage.

<Arc Fusing Process S4>

The arc fusing process S4 shown in FIG. 10 includes a mold position setting process S41 and an electrode position setting process S42. In the arc fusing process S4, the mold position is set by the mold position setting unit 30, the position of the carbon electrodes 13 are set by the electrode position setting unit 20, the retained silica powder layer 11 is heated by the arc discharge unit while the silica powder layer 11 is subjected to a reduced pressure through ventilation holes 12. As a result, the silica powder layer 11 is fused to form a vitreous silica layer.

A transparent layer having virtually no bubbles (i.e., bubble content of less than 0.5%) can be formed by subjecting the silica powder layer to a reduced pressure of −50 kPa or more and less than −95 kPa while fusing the silica powder layer. Furthermore, after the transparent layer is formed, a bubble-containing layer having a bubble content of 0.5% or more and less than 50% can be formed on the outer side of the transparent layer by subjecting the silica powder layer to a pressure of +10 kPa or more and less than −20 kPa. In the present specification, the bubble content rate refers to the ratio ($w_2/w_1$) of the volume ($w_2$) occupied by bubbles in a unit volume ($w_1$) of the crucible. In the present specification, the value of the pressure is the value with reference to the ambient air pressure.

In the mold position setting process S41 shown in FIG. 10, a height position (T6) and a horizontal position (T5) of the mold, and a tilt (Ψ2) with respect to the vertical direction of the mold rotation axis line L is set by the mold position setting unit 30.

Next, in the electrode position adjusting process S42 shown in FIG. 10, the intertip distances D are enlarged by changing the angles of the carbon electrodes 13 while maintaining the inverse three-sided pyramid with a downward tip by the electrode position setting unit 20. Then, arc discharge starts to be generated between the carbon electrodes 13. Supplied power to each of the carbon electrodes 13 is controlled to be a power density of 40 kVA/cm² to 1700 kVA/cm² by a power-supply unit. Furthermore, the mold-electrode relative position, such as the electrode height position, is set to satisfy conditions as a heat source necessary for fusing of the silica powder layer 11 while maintaining the angle of θ1 by the electrode position setting unit 20. The mold-electrode relative position includes, for example, a state that carbon electrodes 13 is eccentric with respect to the mold rotation axis line L as shown in FIG. 4, a state that the electrode central axis line LL is tilted in an angle of Ψ1 with respect to the vertical direction as shown in FIG. 5, and a state that the carbon electrode position setting and the mold position setting are combined as shown in FIG. 6. Thus, the mold-electrode relative position can be discretionarily set so as to satisfy conditions as a heat source necessary for fusing of the silica powder layer 11.

In FIG. 10, in the arc fusing process S4, an example where the electrode position setting process S42 is carried out after the mold position setting process S41. However, the present invention is not limited to this example. The electrode position setting process S42 may be carried out before the mold position setting process S41, and the mold position setting process S41 and the electrode position setting process S42 can be carried out simultaneously. Furthermore, only one of the mold position setting process S41 and the electrode position setting process S42 may be carried out to set the mold-electrode relative position.

<Fire Polishing Process>

The fire polishing process S5 shown in FIG. 10 includes a mold position setting process S51 and an electrode position setting process S52. In the fire polishing process S5, the mold position is set by the mold position setting unit 30, the position of the carbon electrodes 13 are set by the electrode position setting unit 20, and an arc flame is thrown toward a target surface of a vitreous silica crucible in the mold for surface removal. An innermost seal layer is formed in the beginning of the arc fusing process before the vacuum suction is started, and thus includes a large amount of bubbles and impurities such as crystalline residue comprised of unfused silica powder. Such bubbles and impurities can be removed in the fire polishing process.

Figure 13:
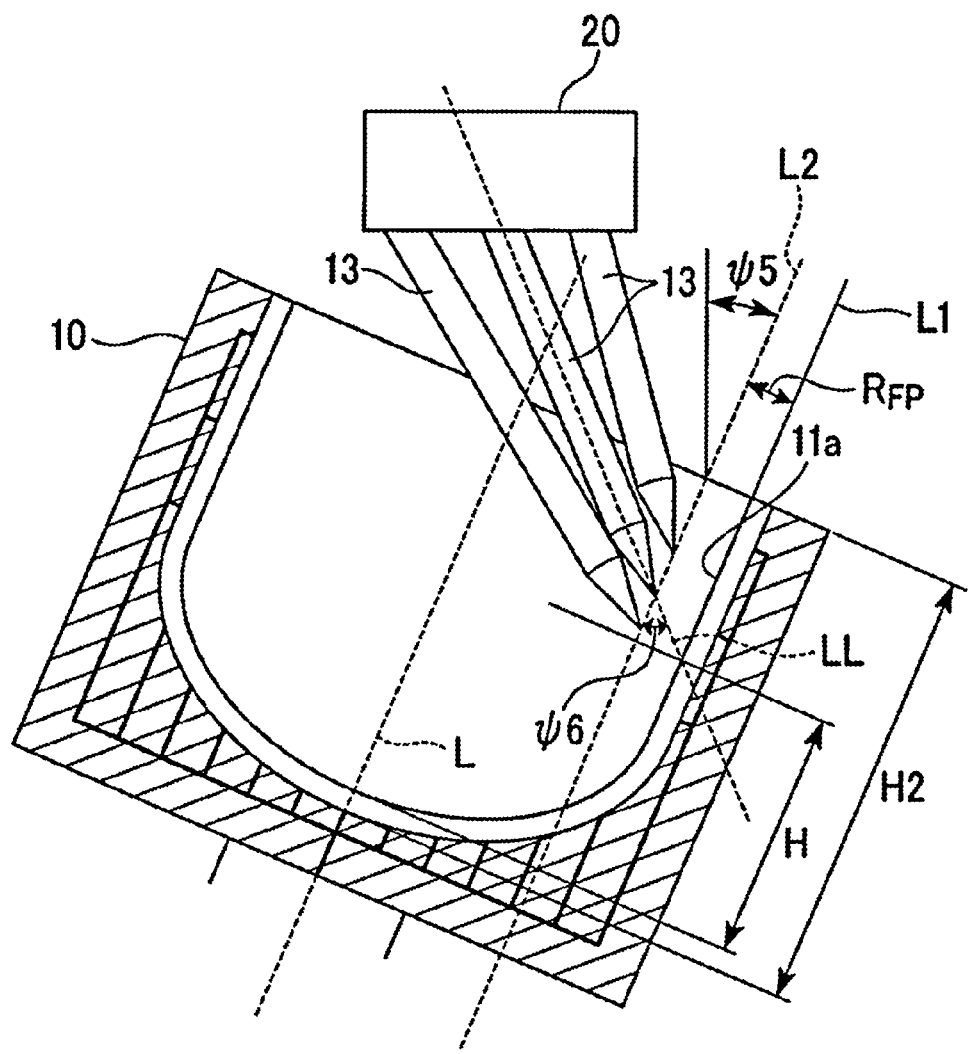
FIG. 13 is a diagram illustrating an example of electrode and mold placement state in the fire polishing process of an apparatus for manufacturing a vitreous silica crucible according to the present invention.

In the fire polishing process S5 shown in FIG. 10, the mold-electrode relative position is controlled, for example, as shown in FIG. 13, by electrode position setting unit 20 and the mold position setting unit 30 in a similar manner to the above-mentioned arc fusing process S4. In FIG. 10, in the fire polishing process S5, an example where the electrode position setting process S52 is carried out after the mold position setting process S51. However, the present invention is not limited to this example. The electrode position setting process S52 may be carried out before the mold position setting process S51, and the mold position setting process S51 and the electrode position setting process S52 can be carried out simultaneously. Supplied power to each of the carbon electrodes 13 is controlled to be a power density of 40 kVA/cm² to 1700 kVA/cm² by a power-supply unit.

Figure 12:
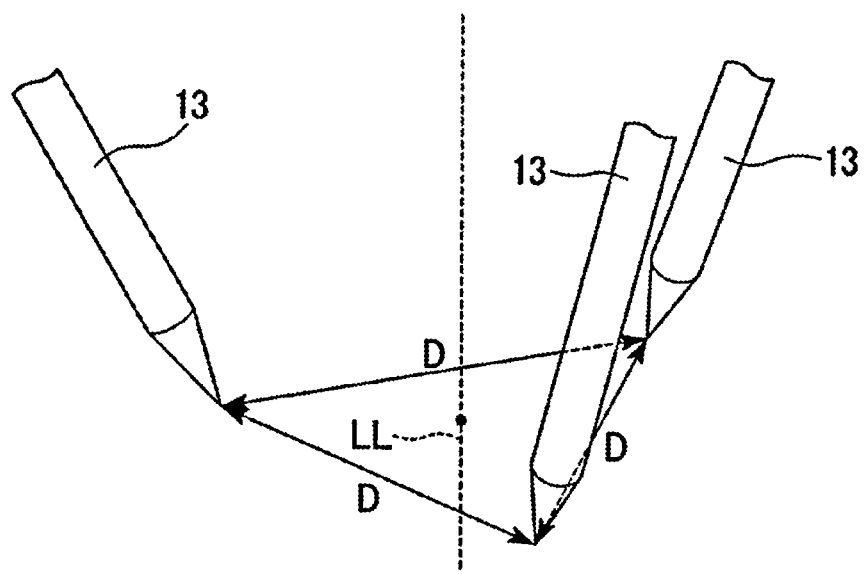
FIG. 12 is a diagram illustrating an electrode placement state of an apparatus for manufacturing a vitreous silica crucible according to the present invention.

The electrode-mold relative position in the fire polishing process S5 shown in FIG. 10 is preferred to be set so that distances $R_{FP}$ from the tips of the carbon electrodes 13 to the target surface 11a are equal. According to this configuration, ununiformity of the consumption of carbon electrodes is reduced. When the ununiformity is large, the arc discharge is hard to be continued. Furthermore, as shown in FIG. 12, the intertip distances D of the carbon electrodes 13 are set to be equal. According to this configuration, an arc flame is stably generated, and the target surface 11a can be removed together with bubbles and impurities contained therein.

The distances $R_{FP}$ from the tips of the carbon electrodes 13 to the target surface 11a are preferred to 5 to 200 mm, and are more preferred to be 20 to 50 mm. When the distances $R_{FP}$ are less than 5 mm, the arc flame is applied too strongly toward the target surface 11a and the target surface 11a is deformed and thus irregularity is formed in an inner surface of a resulting vitreous silica crucible. Thus, such distances are not preferred. On the other hand, when the distances $R_{FP}$ are over 200 mm, the distances are too large and thus the target surface 11a is not sufficiently removed by the arc flame thrown toward the target surface 11a. The intertip distances of the carbon electrodes 13 are preferred to be equal. Thus, such configuration is preferred.

Angles θ1 between the adjacent carbon electrodes 13 in the fire polishing process S5 can be changed dependent on the lengths of the carbon electrodes 13, the carbon electrode positions (height, horizontal positions etc.), an opening diameter φ of a resulting vitreous silica crucible, and so on. The Angles θ1 can be set by setting the distances $R_{FP}$ and the intertip distances D as mentioned above.

In the fire polishing process S5, when an inner surface of the vitreous silica crucible is removed by fire polishing as shown in FIG. 13, the angle between the electrode central axis line LL and the mold rotation axis line L can be set to be a range of 0.5 to 60°, and is preferred to be set to be a range of 10 to 45°. The electrode central axis line LL is directed to a direction in which an arc flame is thrown. Because the fire polishing process of the present invention is a process to remove an inner surface of a vitreous silica crucible by throwing an arc flame toward the inner surface, the angle between the target surface 11a and the electrode central axis line LL in the fire polishing process S5 is desired to an angle near 90°. However, in view of the structure of a commonly-used vitreous silica crucible manufacturing apparatus, it is difficult to set the angle to 90°. Furthermore, as shown in FIG. 13, when an inner surface of a sidewall of a vitreous silica crucible is subjected to fire polishing, a line L1 along the target surface 11a is always parallel to a plane L2 passing through the tips of the carbon electrodes 13, and they are tilted to a direction of Ψ5 from the vertical direction.

In the fire polishing process S5, a position from which an arc flame is thrown (hereinafter referred to as "arc flame thrown position") may be sequentially moved from a bottom center side (C3 in FIG. 11) to an upper end side (C1 in FIG. 11) of the vitreous silica crucible. In this case, the mold-electrode relative position is set by adjusting the angle θ1, the length T4, the height T, and the tilt Ψ1 of the carbon electrodes 13, the height T6, the tilt Ψ2, and the horizontal position T5 of the mold 10 may be adjusted by the combination of the electrode position setting unit 20 and the mold position setting unit 30 so that intertip distances D of the carbon electrodes are equal and the distances $R_{FP}$ from the tips of the carbon electrodes to the target surface are equal. In the fire polishing process S5, when the arc flame thrown position is sequentially moved from the crucible bottom center side C3 to the upper end side C1 along the inner surface, for example, as shown in FIGS. 15A and 15B, the ratio (H/H2) varies with time t, where H is a distance between the carbon electrodes 13 and the crucible bottom inner surface and H2 is the crucible height shown in FIG. 13.

Figure 15A:
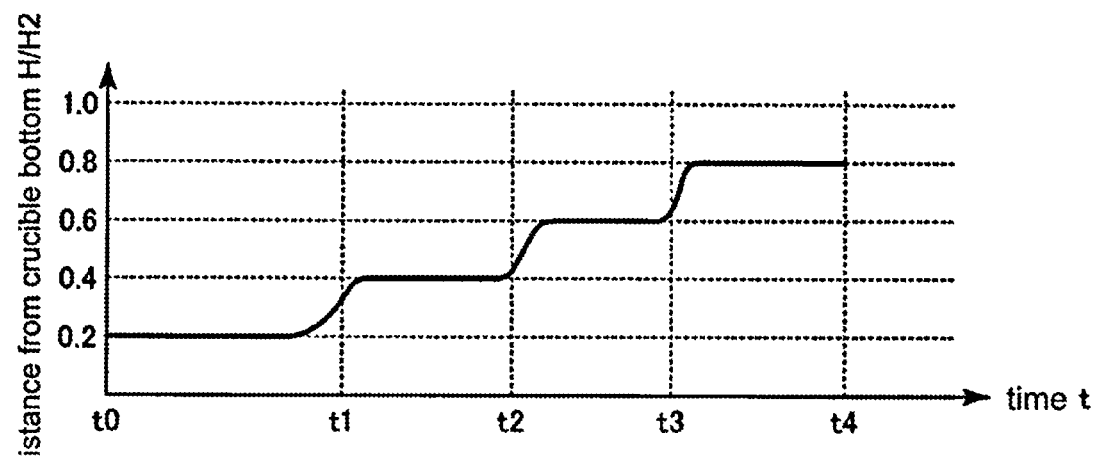
FIGS. 15A and 15B are time charts illustrating an example of change in carbon electrodes relative height (FIG. 15A) and change in angle between an electrode central axis line and a mold rotation axis line (FIG. 15B), respectively, with respect to arc discharge time in the fire polishing process according to an embodiment of the present invention.
Figure 15B:
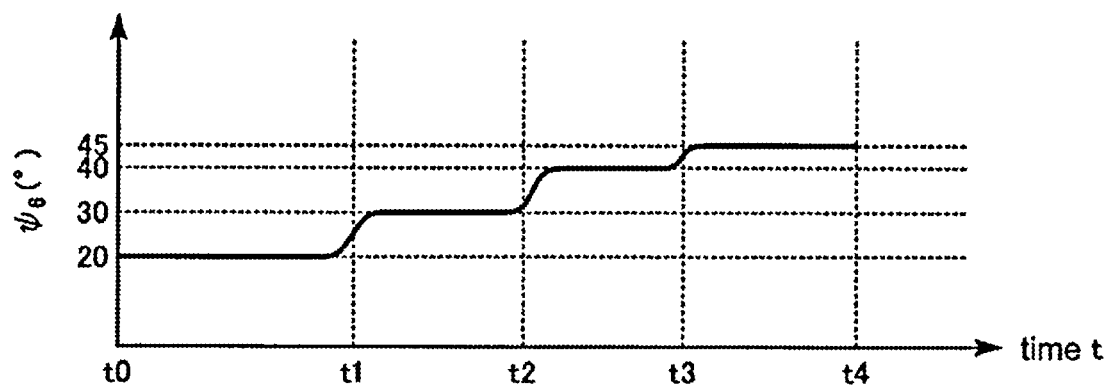

As shown in FIGS. 15A and 15B, fire polishing may be carried out by setting the ratio H/H2 and the angle Ψ6 between the carbon electrode central axis line LL and the mold rotation axis line L in the following way.

Time t0 to t1: H/H2=0.2, Ψ6=20°
Time t1 to t2: H/H2=0.4, Ψ6=30°
Time t2 to t3: H/H2=0.6, Ψ6=40°
Time t3 to t4: H/H2=0.8, Ψ6=45°

Furthermore, in the fire polishing process S5, an arc flame thrown position may be sequentially moved from an upper end side (C1 in FIG. 11) to a bottom center side (C3 in FIG. 11) of the vitreous silica crucible. In this case, the mold-electrode relative position is set by adjusting the angle θ1, the length T4, the height T, and the tilt Ψ1 of the carbon electrodes 13, the height T6, the tilt Ψ2, and the horizontal position T5 of the mold 10 may be adjusted by the combination of the electrode position setting unit 20 and the mold position setting unit 30 so that intertip distances D of the carbon electrodes are equal and the distances $R_{FP}$ from the tips of the carbon electrodes to the target surface are equal.

Figure 14A:
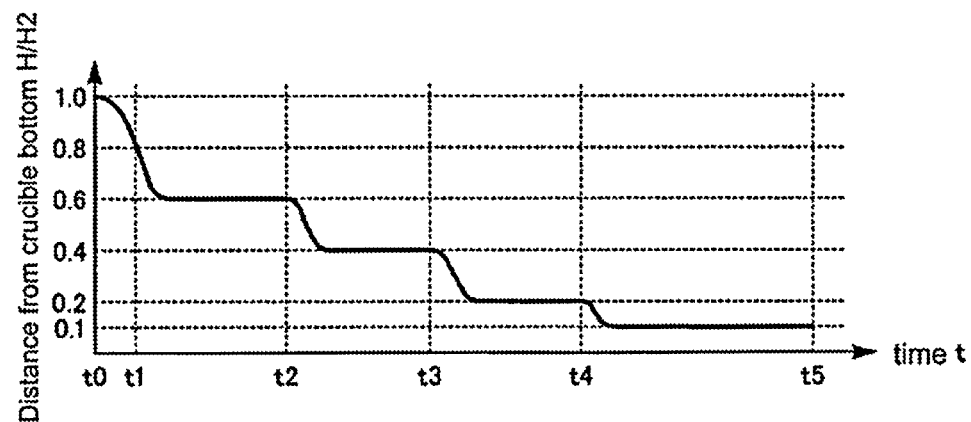
FIGS. 14A and 14B are time charts illustrating an example of change in carbon electrodes relative height (FIG. 14A) and change in angle between an electrode central axis line and a mold rotation axis line (FIG. 14B), respectively, with respect to arc discharge time in the fire polishing process according to an embodiment of the present invention.
Figure 14B:
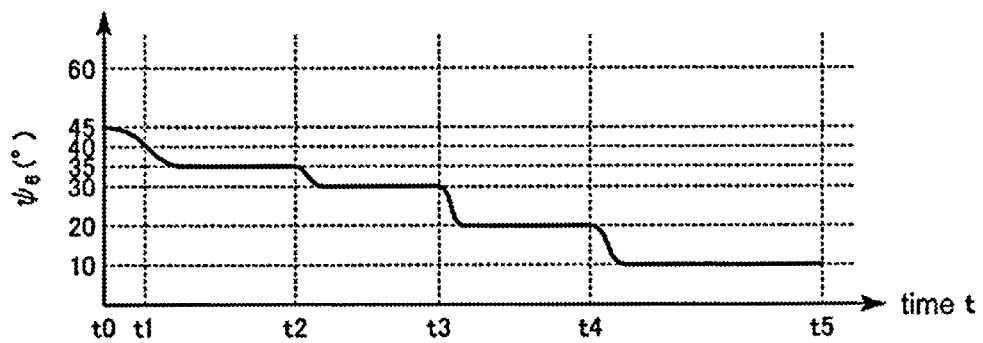

As shown in FIGS. 14A and 14B, fire polishing may be carried out by setting the ratio H/H2 and the angle Ψ6 between the carbon electrode central axis line LL and the mold rotation axis line L in the following way.

Time t0 to t1: H/H2=0.8 to 1.0, Ψ6=40 to 45°
Time t1 to t2: H/H2=0.6, Ψ6=35°
Time t2 to t3: H/H2=0.4, Ψ6=30°
Time t3 to t4: H/H2=0.2, Ψ6=20°
Time t4 to t5: H/H2=0.1, Ψ6=10°

In the above-mentioned examples, in the fire polishing process S5, the arc flame thrown position is sequentially stepwise moved from the bottom center side C3 to the upper end side C1 or from the upper end side C1 to the bottom center side C3. However, the present invention is not limited to these examples. The arc flame thrown position may be moved continuously instead of stepwise. Furthermore, the fire polishing may be carried out only toward a portion of the inner surface of the vitreous silica crucible to remove the target surface 11a. It is known that inner surface properties of a sidewall surface of a vitreous silica crucible are especially important for growth of a silicon single crystal. Therefore, it is efficient to apply fire polishing only to the sidewall surface to improve the quality of the vitreous silica crucible.

The arc flame thrown position may be set to move at a speed of 0.1 to 50 cm/min, and preferred to be set to move at a speed of 5 to 30 cm/min. When the speed is less than 0.1 cm/min, the arc flame is applied too strongly toward the target surface 11a and the target surface 11a is deformed and thus irregularity is formed in an inner surface of the resulting vitreous silica crucible. Thus, such speed is not preferred. On the other hand, when the speed is over 50 cm/min, the target surface 11a is not sufficiently removed by the arc flame thrown toward the target surface 11a. Thus, such speed is not preferred.

The inner surface is removed in a thickness of about 1 mm (0.5 mm to 1 mm) in the fire polishing process S5. When the thickness is over 2 mm, the operation time takes too much time, and the productivity drops. Thus, such thickness is not preferred. The temperatures in the arc fusing process and the fire polishing process are approximately 2100 degrees C. and 2400 degrees C., respectively. Thus, the temperature in the fire polishing process is higher than that in the arc fusing process.

In FIG. 10, the fire polishing process S5 is carried out after the arc fusing process S4. This is exemplary, and the present invention is not limited to the example. The arc fusing process S4 and the fire polishing process S5 may be carried out simultaneously.

The fire polishing process S5 is preferred to be carried out during 10 to 90% of the total arc time, and more preferred to be carried out during 40 to 80% of the total arc time. A vitreous silica crucible with reduced amount of bubbles and impurities in the inner surface can be manufactured by conducting the fire polishing process S5 during the above-mentioned period.

<Power Supply Terminating Process S6>

In the power supply terminating process S6, power supply by a power-supply unit is terminated when the silica powder layer 11 is fused to be a predetermined state, and the surface removal in the fire polishing process is completed.

Figure 11:
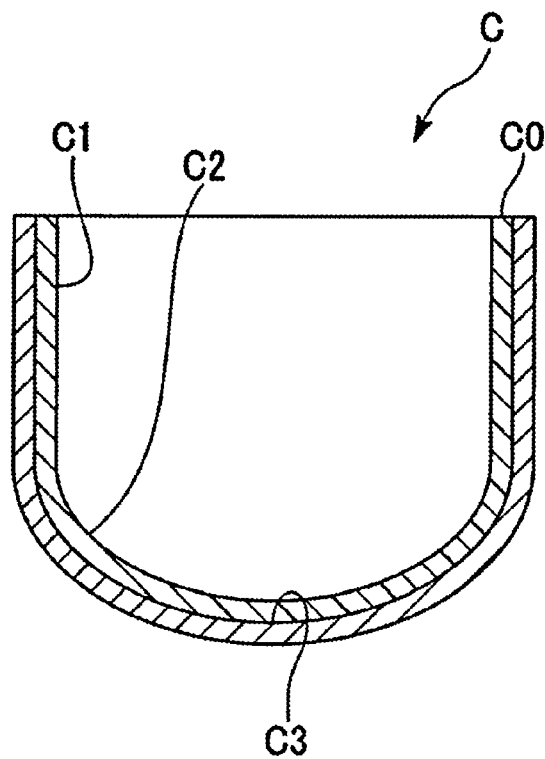
FIG. 11 is a front sectional view illustrating a vitreous silica crucible manufactured by a method and apparatus for manufacturing a vitreous silica crucible according to the present invention.

As mentioned above, a vitreous silica crucible is manufactured by arc-fusing silica powder according to the rotating mold method. As shown in FIG. 11, the vitreous silica crucible C manufactured by the method of the present invention includes a transparent layer C0 on a sidewall portion C1, a corner portion C2, and a bottom portion C3. The transparent layer C0 has a thickness within a certain range and uniform properties. According to the present invention, because an inner surface is removed in the fire polishing process by throwing an arc flame toward the inner surface, a vitreous silica crucible with reduced amount of bubbles and impurities in the inner surface can be manufactured. Therefore, when the vitreous silica crucible manufactured by the method of the present invention is used for silicon single crystal pulling, generation of cristobalite is reduced and thus the crystallization yield of a silicon single crystal is enhanced.

In the present embodiment, arc discharge is generated by three carbon electrodes 13 powered by three-phase alternative current. However, this is exemplary and the present invention is not limited to the example. Arc discharge may be generated by six electrodes powered by three-phase alternative current as shown in FIG. 8, and four electrodes powered by two-phase alternative current as shown in FIG. 9 may be employed.

Figure 8:
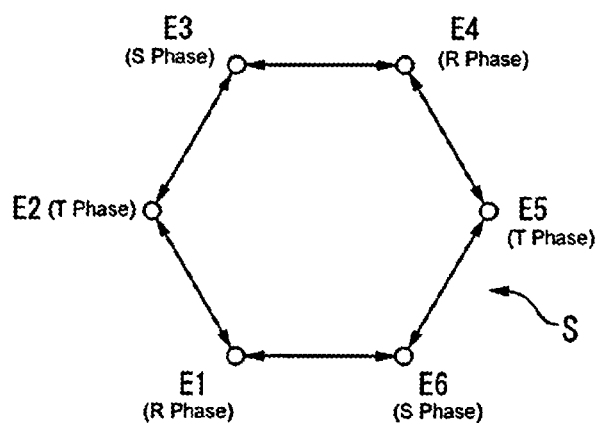
FIG. 8 is a diagram illustrating a carbon electrodes position of an apparatus for manufacturing a vitreous silica crucible according to the present invention.
Figure 9:
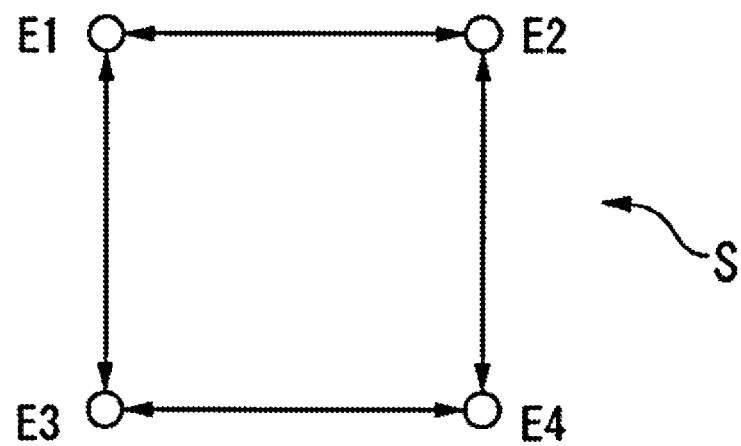
FIG. 9 is a diagram illustrating a carbon electrodes position of an apparatus for manufacturing a vitreous silica crucible according to the present invention.

FIG. 8 shows an example of an electrode configuration according to the present invention, and show a diagram of a horizontal position of six electrodes at the height of the tips of the electrodes. These electrodes are powered by three-phase alternative current.

In this example, six electrodes (E1 to E6) are powered by three-phase alternative current, and they are placed around the mold rotation axis so that interelectrode distances (distances between adjacent electrodes) are equal. A hexagonal shape can be formed by connecting the electrodes. Differences in phase between adjacent electrodes are 120° with respect to three-phase alternative current. So, the electrodes facing each other across the ring center are in-phase. Specifically, when the electrode E1 is in R phase with respect to three-phase alternative current, the electrode E4 facing electrode E1 across the ring center is also in R phase. Furthermore, the electrode E2 is in T phase, the electrode E6 is in S phase, the electrode E3 is in S phase, and the electrode E5 is in T phase. Therefore, a pair of the electrode E1 and the electrode E4, a pair of the electrode E2 and the electrode E5, a pair of the electrode E3 and the electrode E6 are each in phase, and other pairs of electrodes are in different phases.

In the electrode configuration shown in FIG. 8, a pair of the electrode E1 and the electrode E2 and a pair of the electrode E1 and the electrode E6 are each in different phases, the electrodes E2, E6 are adjacent to the electrode E1. Therefore, stable ring-shaped arc is formed between the electrode E1 and the adjacent electrodes. On the contrary, the electrodes E1 and the electrode E4 are in-phase, and thus arc crossing the ring center is not formed and excessive heating at the crucible center can be avoided. Furthermore, according to the above-mentioned electrode configuration, because arc is formed between adjacent electrodes, the arc is unlikely to be stopped even when interelectrode distances are enlarged to enlarge a heating range. In the present invention, the ring-shaped arc includes arc formed concentrically with a crucible inner surface by electrodes protruding into a crucible inside.

FIG. 9 shows another example of an electrode configuration according to the present invention, and shows a diagram of a horizontal position of four electrodes at the height of the tips of the electrodes. These electrodes are powered by two-phase alternative current.

In this electrode configuration, electrodes are placed around the mold rotation axis so that interelectrode distances are equal. A square shape can be formed by connecting the electrodes. Differences in phase between adjacent electrodes are 180° with respect to two-phase alternative current, and thus arc is formed between these electrodes. On the contrary, the electrodes facing each other across the ring center are in-phase, and thus no arc is formed between these electrodes, and therefore no arc crossing the ring center is formed. In general, in an electrode configuration where the number of electrodes are 2 n (n≥3) and two-phase alternative current is employed, likewise, arc is formed between adjacent electrodes, and no stable arc crossing the ring center is formed.

In the present invention, the number of electrodes may be 3 to 20, and the electrode configuration may be either of six electrodes powered by two-phase alternative current, eight electrodes powered by two-phase alternative current, ten electrodes powered by two-phase alternative current, nine electrodes powered by three-phase alternative current, twelve electrodes powered by three-phase alternative current, fifteen electrodes powered by three-phase alternative current, four electrodes powered by four-phase alternative current, eight electrodes powered by four-phase alternative current, twelve electrodes powered by four-phase alternative current, and sixteen electrodes powered by four-phase alternative current. Furthermore, when the number of electrodes is four or more, it is possible to simultaneously exclude plural electrodes from being powered.

A method and an apparatus for manufacturing a vitreous silica crucible according to the present invention may be preferably employed for manufacturing a vitreous silica crucible with an opening diameter of φ24 to 50 inches (61 to 127 cm).

In the present invention, the carbon electrodes 13 can be moved along the axis line direction T4 to achieve a state that the distances $R_{FP}$ of the tips of the electrodes are equal as shown in FIG. 13 etc. from a state that the tips of the electrodes are substantially on the same horizontal plane at the beginning of the arc fusing as shown in FIGS. 2 and 3.

EXAMPLE

Examples of the present invention and Comparative examples are shown below. The present invention is not limited to the examples below.

In Examples and Comparative examples, vitreous silica crucibles were manufactured by the rotating mold method using a vitreous silica crucible manufacturing apparatus 1 shown in FIG. 1 and in accordance with a flowchart shown in FIG. 10.

The mold had an opening diameter of 32 inches (81.3 cm), an average thickness of a silica powder layer deposited on the mold inner surface is 15 mm, and three electrodes were powered by three-phase alternative current to generate arc discharge.

The electrodes were powered for 90 minutes with an output of 2500 kVA in the arc fusing process. Vacuum suction of the silica powder layer was carried out for the first 10 minutes to depressurize the silica powder layer to −80 kPa.

Examples 1 to 13

In each of Examples 1 to 13, a vitreous silica crucible was manufactured in the following way. First, the arc fusing process was carried out by the above-mentioned method. Thereafter, a mold-electrode relative position was controlled by the mold position setting unit 30 and the electrode position setting unit 20 so that distances from the tips of the electrode tips to the target surface were equal, to manufacture a vitreous silica crucible. The outputs power was 2500 kVA, and distances between adjacent carbon electrode tips were set to be equal.

Comparative Example 1

Comparative example 1 was similar to Example 2, but a mold-electrode relative position was controlled so that distances from the tips of the electrode tips to the target surface were 80 mm, 100 mm, 120 mm. The average distance was 100 mm.

Comparative Example 2

In Comparative example 2, after the arc fusing process, the method of manufacturing a vitreous silica crucible was completed without conducting the fire polishing process.

A silicon single crystal was pulled using a vitreous silica crucible manufactured in each of Examples 1 to 13 and Comparative examples 1 to 2, and yield of silicon single crystal (single crystallization yield) was evaluated. The result was shown in Table 1. Yield of silicon single crystal (single crystallization yield) means mass of a straight body portion from which silicon single crystal wafers can be obtained/total mass of polysilicon supplied to the crucible. Difference of 1 mass % in single crystallization yield means difference of 20 sheets of wafers obtained from the silicon single crystal.

TABLE 1

| | Angle $\psi 6$ (°) | Order of Fire Polishing | Electrodes-Target Surface Distance $R_{FP}$ (mm) | Arc Flame Moving Speed (cm/min) | Powered Time (min) | Silicon Single Crystallization Yield (%) |
|---|---|---|---|---|---|---|
| Ex. 1 | 5 | Upper End to Bottom | 5 | 50 | 90 | 88 |
| Ex. 2 | 30 | Upper End to Bottom | 100 | 10 | 90 | 91 |
| Ex. 3 | 60 | Upper End to Bottom | 200 | 0.1 | 90 | 90 |
| Ex. 4 | 5 | Bottom to Upper End | 5 | 50 | 90 | 89 |
| Ex. 5 | 30 | Bottom to Upper End | 100 | 10 | 90 | 92 |
| Ex. 6 | 60 | Bottom to Upper End | 200 | 0.1 | 90 | 90 |
| Ex. 7 | 0 | Upper End to Bottom | 5 | 50 | 90 | 41 |
| Ex. 8 | 5 | Upper End to Bottom | 220 | 0.1 | 90 | 42 |
| Ex. 9 | 30 | Upper End to Bottom | 2 | 50 | 90 | 40 |
| Ex. 10 | 60 | Upper End to Bottom | 5 | 60 | 90 | 45 |
| Ex. 11 | 5 | Bottom to Upper End | 220 | 0.1 | 90 | 50 |
| Ex. 12 | 30 | Bottom to Upper End | 2 | 50 | 90 | 38 |
| Ex. 13 | 60 | Bottom to Upper End | 5 | 60 | 90 | 43 |
| Comp. Ex. 1 | 30 | Upper End to Bottom | 100 (average) | 10 | 90 | 70 |
| Comp. Ex. 2 | | No Fire Polishing | — | — | 90 | 42 |

As shown in Table 1, in Examples 1 to 6 where the fire polishing process was conducted, a high silicon single crystallization yield was achieved. On the contrary, in Comparative example 2 where the fire polishing process was not conducted, silicon single crystallization yield was low. This results shows that silicon single crystallization yield can be enhanced by including the fire polishing process in the manufacturing process. Furthermore, in Examples 1 to 6 where the angle Ψ6 between the electrode central axis line LL and the mold rotation axis line L was 0.5 to 60°, the distances $R_{FP}$ from the tips of the carbon electrodes to the target surface were 5 to 200 mm, and the moving speed of the arc flame thrown position was 0.1 to 50 cm/min, a higher silicon single crystallization yield was achieved than that in Examples 7 to 13. Furthermore, in Comparative example 1 where intertip distances were not equal, single crystallization yield was lower and the ununiformity of the consumption of the electrodes were larger than that in Example 2 where intertip distances were equal.

The result shows that it is apparent that according to the present invention, provided is a vitreous silica crucible with reduced amount of bubbles and impurities, which improves silicon single crystallization yield when used for silicon single crystal pulling.

| EXPLANATION OF REFERENCE SYMBOL | |
| --- | --- |
| 10 | Mold |
| 11 | Silica Powder Layer |
| 13 | Carbon Electrode |
| 20 | Electrode Position Setting Unit |
| 30 | Mold Position Setting Unit |

What is claimed is:

1. A method for manufacturing a vitreous silica crucible comprising:
    a silica powder supplying process of supplying silica powder in a rotating mold to form a silica powder layer;
    an arc fusing process of fusing the silica powder layer by arc discharge generated by carbon electrodes; and
    a fire polishing process of throwing an arc flame toward a target surface of the silica powder layer for surface removal, wherein, in the fire polishing process, distances from tips of the carbon electrodes to the target surface are set to be equal, an angle of a central axis line of the carbon electrodes and a mold rotation axis is set to be 0.5 to 60°, the distances from the tips of the carbon electrodes to the target surface are set to be 5 to 200 mm, and the arc flame is set to be moved at a speed of 0.1 to 50 cm/min, and
    wherein, after the arc fusing process, the fire polishing process is carried out so as to remove from the surface a thickness of 0.1 mm to 2 mm, and
    wherein the silica powder layer consists of an outer layer of natural silica powder and an inner layer of synthetic silica powder.

2. The method of claim 1, wherein the carbon electrodes are positioned so that the distances between the tips of the adjacent carbon electrodes are equal.

3. The method of claim 1, wherein the fire polishing process is carried out during 10 to 90% of the total arc time.

4. The method of claim 1, wherein, in the fire polishing process, the arc flame is moved from a bottom center to an upper end of the crucible.

5. The method of claim 1, wherein, in the fire polishing process, the arc flame is moved from an upper end to a bottom center of the crucible.

* * * * *